Figures 1, 2:
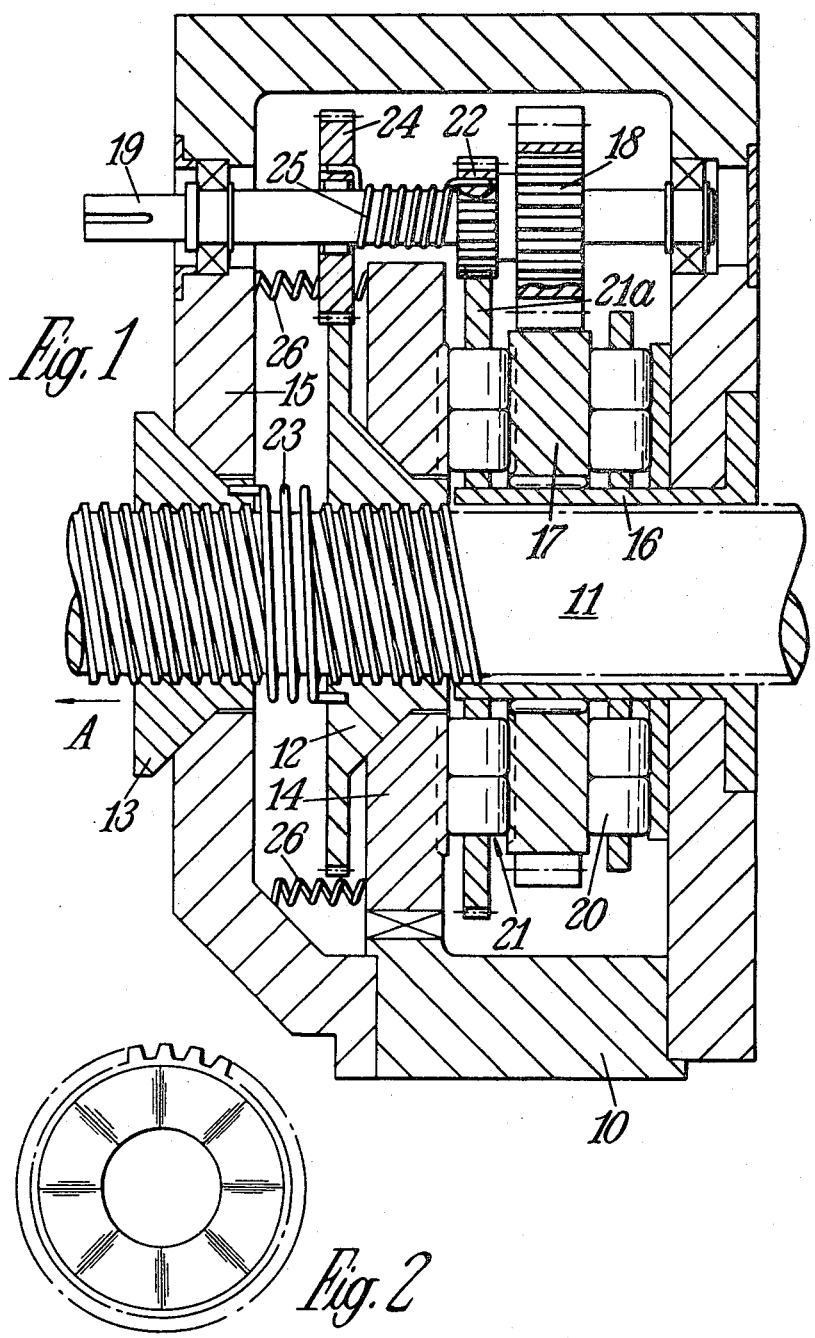

July 23, 1968 J. C. F. WHICKER 3,393,570

LINEAR ACTUATORS

Filed June 20, 1966

United States Patent Office 3,393,570
Patented July 23, 1968

3,393,570
LINEAR ACTUATORS
John Charles Frederick Whicker, Tring, England, assignor to Rotax Limited, London, England
Filed June 20, 1966, Ser. No. 558,821
Claims priority, application Great Britain, June 25, 1965, 26,970/65
11 Claims. (Cl. 74—57)

This invention relates to linear actuators and has for its object to provide such an actuator in a simple and convenient form.

According to the invention an actuator of the kind specified comprises in combination, a housing, a peripherally threaded shaft extending through the housing, first and second nuts engaged upon the shaft, first and second abutments against which the nuts can bear respectively when a load is applied between the shaft and housing, means for moving the first abutment intermittently in a forward direction thereby to cause the first nut and shaft to be moved axially relative to the housing, energy storing means acting intermediate the two nuts for rotating the second nut to maintain it in contact with the second abutment whilst the first abutment is being moved in the forward direction, said means for moving the first abutment being arranged, intermediate periods of forward movement, to allow the first abutment to move rearwardly and driving means for rotating the first nut to maintain it in contact with the first abutment whilst the latter is moving rearwardly.

In the accompanying drawings:

FIGURE 1 is a sectional elevation of one example of a linear actuator in accordance with the invention, and FIGURE 2 is an end view of part of the actuator shown in FIGURE 1.

Referring to the drawings there is provided a housing 10 through which extends a peripherally threaded and non-rotatable shaft 11. The shaft is intended to be moved in the direction of the arrow A, against a load to be moved or raised. Engaged with the shaft are first and second nuts 12, 13 respectively and also provided are first and second abutments 14 and 15 against which the nuts 12 and 13 bear respectively. The abutment 14 comprises an annular ring which is permitted axial movement within the housing but which is restrained against angular movement by a spline connection with the housing. The abutment 15 is defined by an end wall of the housing. Extending within the housing is a sleeve like bearing member 16 about which is rotatably mounted an annular member 17 having gear teeth formed on its external periphery. These teeth mesh with a pinion 18 mounted on a rotatable input shaft 19 which is supported for rotation within the housing. Located intermediate the member 17 and the adjacent end wall of the housing is a thrust bearing 20 and rotatably mounted about the bearing member 16 is the cage 21a of a roller thrust race 21. The periphery of the cage 21a is provided with teeth which are engaged with a pinion 22 mounted on the shaft 19 and the ratio of the gear connection between the shaft 19 and the cage and the connection between the shaft 19 and the member 17 are such that the cage rotates at half the speed of the member 17. The rollers of the thrust race 21 bear against the adjacent faces of the abutment 14 and the member 17. These faces are formed with undulating face cam surfaces as shown in dotted outline and the arrangement is such that as the driven shaft is rotated axial movement will be imparted to the abutment 14 in the direction of the arrow A.

Interconnecting the nuts 12 and 13 is an energy storing means in the form of a torsion spring 23 which surrounds the shaft 11. Moreover, the nut 12 is provided with teeth on its periphery which are engaged with teeth on a pinion 24 which is freely mounted about the driven shaft 19 and connected thereto through the intermediary of a coiled torsion spring 25.

The operation of the device will now be described, considering the parts of the actuator in the positions shown in the drawing. In this position the spring 23 is stressed and the load is divided between the two nuts. Upon rotation of the drive shaft the abutment 14 is moved in the direction of the arrow A and in so doing the nut 12 and shaft 11 are also moved in this direction. The nut 12 is prevented from rotating by the friction existing between the engaging surfaces of the nut and abutment with the result that the pinion 24 is held against rotation and the spring 25 is stressed. As the shaft moves forward the nut 13 tends to move away out of engagement with the abutment 15 but the spring 23 causes the nut to rotate on the shaft to maintain the engagement. After the abutment 14 has reached the limit of its travel it is moved in the opposite direction by springs 26, this movement being allowed by virtue of the form of the cam surfaces, upon continued rotation of the drive shaft 19. The load is then transferred wholly to the nut 13 and forward motion of the shaft stops. The spring 25 then unwinds to rotate the nut 12 upon the shaft and to urge the abutment 14 in the reverse direction, until the position of the parts as indicated is reached. During this movement the spring 23 is restressed and it will be appreciated that the spring 25 is stronger than the spring 23. Thereafter the cycle is repeated.

It will be appreciated that the actuator as described is not reversible so that in order to lower the load, means (not shown) is provided to rotate the shaft which during normal operation as described is prevented from angular movement.

Having thus described my invention what I claim as new and desire to secure by Letters Patent is:

1. A linear actuator comprising in combination, a housing, a peripherally threaded shaft extending through the housing, first and second nuts engaged upon the shaft, first and second abutments against which the nuts can bear respectively when a load is applied between the shaft and housing, means for moving the first abutment intermittently in a forward direction thereby to cause the first nut and shaft to be moved axially relative to the housing, energy storing means acting intermediate the two nuts for rotating the second nut to maintain it in contact with the second abutment whilst the first abutment is being moved in the forward direction, said means for moving the first abutment being arranged, intermediate periods of forward movement, to allow the first abutment to move rearwardly and driving means for rotating the first nut to maintain it in contact with the first abutment whilst the latter is moving rearwardly.

2. A linear actuator as claimed in claim 1 in which said energy storing means comprises a spring which is stressed whilst the first nut is being rotated to move it rearwardly.

3. A linear actuator as claimed in claim 2 in which said means comprises a cam and a follower one of which is arranged to be driven to cause operation of the actuator.

4. A linear actuator as claimed in claim 3 in which the first nut is arranged to be rotated rearwardly by a further energy storage means.

5. A linear actuator as claimed in claim 4 in which said further energy storage means comprises a further spring which is arranged to be stressed during the time the first nut is being moved forwardly by said means.

6. A linear actuator as claimed in claim 5 including a drive shaft mounted with the housing, a pinion mounted freely about said drive shaft, the teeth of said pinion being engaged with teeth formed on the periphery of the first nut, said further spring being mounted about said shaft and having its ends connected to the pinion and shaft respectively.

7. A linear actuator as claimed in claim 6 in which said means for moving the first nut intermittently comprises a first face cam surface formed on the first abutment, and a plurality of rollers engaging said cam surface, said rollers being mounted within a cage which is driven by the drive shaft.

8. A linear actuator as claimed in claim 7 including an annular member which is arranged to be driven by said shaft, said annular member defining a second cam surface against which said rollers bear, said annular member and said cage being arranged to be rotated at different speeds whereby as the shaft rotates axial movement will be imparted to the first abutment.

9. A linear actuator as claimed in claim 8 in which said second abutment is defined by a part of the housing.

10. A linear actuator as claimed in claim 9 in which said cage and said annular member are mounted about a sleeve like bearing member mounted within the housing and surrounding the shaft.

11. A linear actuator as claimed in claim 10 including a thrust bearing acting between the annular member and a part of the housing.

References Cited

UNITED STATES PATENTS

| | | | |
|---|---|---|---|
| 142,903 | 9/1873 | Doubler | 74—56 |
| 864,379 | 8/1907 | Junghans | 74—424.8 |
| 1,089,408 | 3/1914 | Granderton | 74—57 |
| 2,417,434 | 3/1947 | Mead et al. | 74—424.8 |
| 2,804,778 | 9/1957 | Booth | 74—56 |
| 3,008,340 | 11/1961 | Chillson | 74—424.8 |

FRED C. MATTERN, JR., *Primary Examiner.*

W. S. RATLIFF, *Assistant Examiner.*